Figure 1:
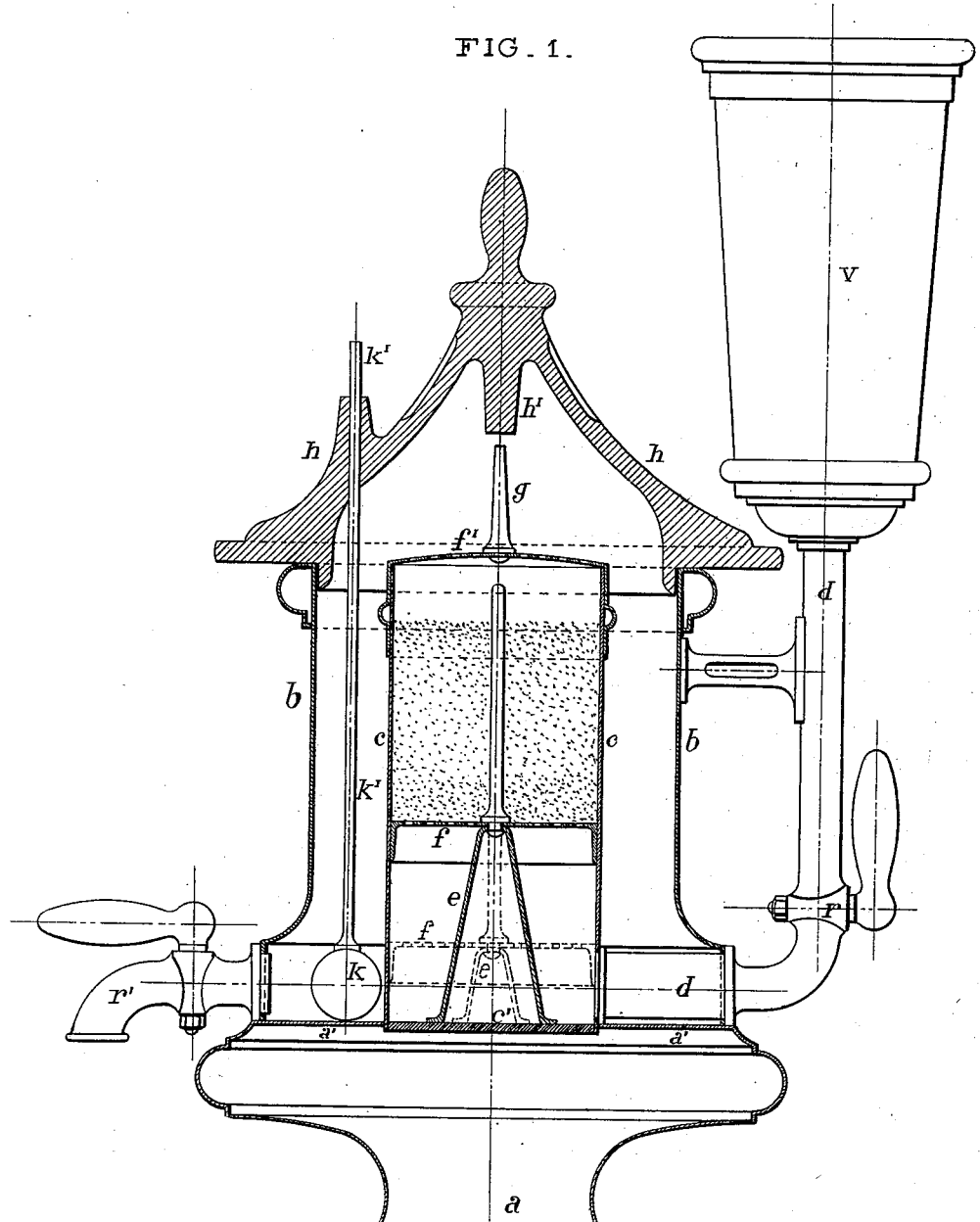

(No Model.)  2 Sheets—Sheet 1.

E. BAZIN.
Hydrostatic Coffee and Tea Pot.

No. 230,523.  Patented July 27, 1880.

Witnesses:

Inventor:

(No Model.) 2 Sheets—Sheet 2.

E. BAZIN.
Hydrostatic Coffee and Tea Pot.

No. 230,523. Patented July 27, 1880.

Witnesses:

Inventor:

UNITED STATES PATENT OFFICE.

ERNEST BAZIN, OF PARIS, FRANCE.

HYDROSTATIC COFFEE AND TEA POT.

SPECIFICATION forming part of Letters Patent No. 230,523, dated July 27, 1880.

Application filed April 28, 1880. (No model.) Patented in France December 3, 1879.

*To all whom it may concern:*

Be it known that I, ERNEST BAZIN, of Paris, in the Republic of France, civil engineer, have invented a new and Improved Hydrostatic Coffee or Tea Pot, for which I have obtained Letters Patent of France for fifteen years, dated December 3, 1879, and numbered 133,961; and I do hereby declare that the following is a full and exact description thereof, reference being made to the accompanying drawings.

The invention relates to a new or improved hydrostatic coffee-pot, based upon the application of the natural hydraulic head for forcing hot water from below upward through a certain quantity of coffee, the effect of the filtration from below upward being to drive or force the light and rich oils and matters from the coffee into a receiver, (which is generally circular and annular,) whence the coffee is delivered for use.

In order to clearly distinguish the novelty and principle upon which my invention is based, I will describe the manner in which coffee has been made heretofore.

Coffee is ordinarily made by filtrations, in some cases simply by pouring hot water on the coffee, which draws away only a very small proportion of the essential oils and rich matters, the greater part remaining on or in the grounds.

In some cases steam is employed in a variety of ways, but always ineffectually and sometimes dangerously. In some apparatuses water at 212° Fahrenheit is thrown over the coffee, and the filtration is effected from above downward. The coffee boils as it is produced, which is objectionable. In other cases steam is employed to force water at 212° from below upward. In this case the filtration, which is from below upward, has the inconvenience of being too energetic, and cannot be regulated by the operator, besides which the oils are retained and absorbed by the flannel envelope which is employed.

Lastly, a very old process consists in causing the coffee to rise from below upward by steam, which in condensing causes afterward filtration from above downward.

My coffee-pot is based upon the physical principle of the equilibrium of liquids in vessels communicating with each other. The same principle is also applicable to making tea without changing anything either in the construction or manner of operating.

In my apparatus the water in contact with the coffee or tea is always under 203° Fahrenheit. It therefore never attacks the ligneous matters and does not burn the oils. With my apparatus any required number of cups of coffee or tea may be made as may be required.

The drawings hereto annexed show two specimens of coffee-pots.

Figure 2:
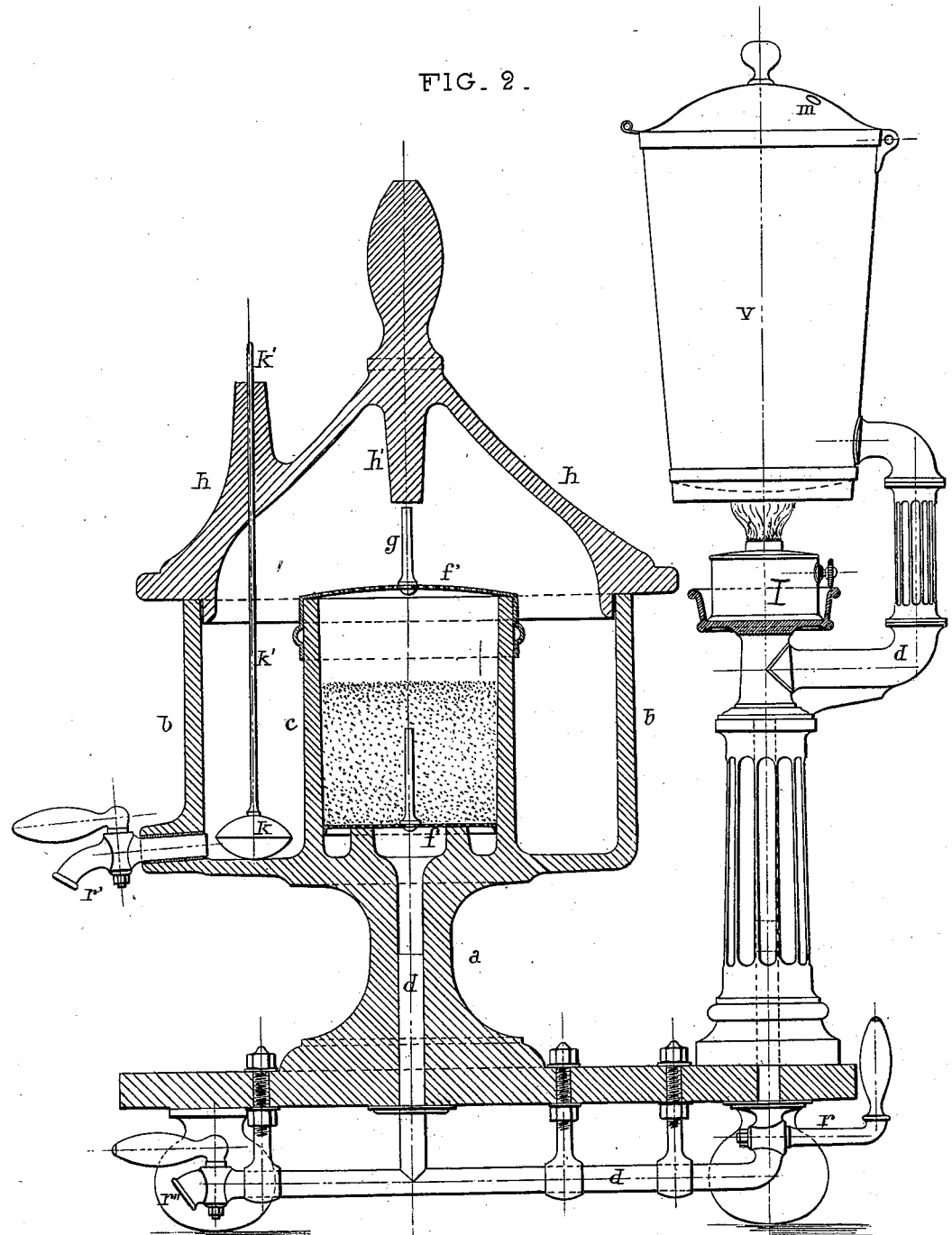

Figure 1 is a vertical section of one in tinned iron for one or two cups. Fig. 2 is a vertical section of a large size in china for six cups.

The arrangement, Fig. 1, to which I give the preference is composed of a foot, $a$, more or less ornamented, terminated above by the top $a'$, which constitutes the bottom of vessel $b$, of circular or other form. Within and concentric to this latter is arranged another circular vessel, $c$, the base of which is soldered over $a'$, and which I close after this base and the admission-pipe for water have been soldered by the plate $c'$, which completes the top of the foot and the bottom of the apparatus.

The two vessels $b$ and $c$ are of the same height. Into the latter opens, as low down as possible, the pipe $d$, which, after passing through the side of the vessel $b$, is bent, and rises vertically to carry the funnel-vase $v$, into which is poured the hot water intended for making the coffee or tea.

In the vessel $c$ is a filter, $f$, which rests upon the bottom by a foot, $e$. On this filter is thrown the requisite quantity of tea or coffee, as indicated by the dotted space. The foot of the filter may be higher or lower, so as to increase or diminish the capacity necessary for the tea or coffee, and also to allow of making with the same apparatus one, two, or several cups of tea or coffee.

The vessel $c$ is covered with a second filter, $f'$, which allows the coffee to run as made into the annular space between the vessels $b$ $c$. This filter is held in place by the abutment of its stem $g$ against a projection, $h'$, of the glass cover $h$, which closes the outer vessel, $b$. Any other means for reaching the same end may be employed, such as, for example, an extension of the filter $f'$, with a bayonet-joint connecting it with the cylinder $c$.

In the annular vessel which receives the coffee when made I place a float, $k$, with a stem, $k'$, passing through the cover $h$, in order to be visible outside to indicate the progress of the operation, and when this latter is finished the number of cups ready to be served. This float may be in wood, cork, hollow metal, aluminum, &c.

A tap, $r$, placed in the hot-water inlet-pipe $d$ serves to regulate the apparatus. Another tap, $r'$, communicating with the annular chamber, serves for drawing off the coffee or tea.

After having placed at the bottom of the vessel $c$ the filter corresponding to the number of cups to be obtained, and placed upon it the ground coffee or the tea, the filter $f'$ and the cover $h$ are put in place and the two taps $r\ r'$ closed. Hot water at about 203° Fahrenheit is poured into the vase $v$. The tap $r$ is then gently opened, and immediately, by reason of the natural hydraulic head, the water passes through the coffee or tea from below upward, seizes the essential oils and the rich elements of the coffee or tea, carrying them with it as the supply increases; then, transformed thus into an infusion of coffee or tea, it escapes through the filter $f'$ and falls into the annular space between vessels $b\ c$.

The float $k$ rises and marks at each moment the progress of the operation.

The example shown in Fig. 2 differs from the preceding in the material employed in its construction, which necessitates some modifications of form and arrangement, which are not of importance as affecting the system.

Under the funnel $v$, I arrange a place for a small spirit-lamp, I, intended either to maintain the temperature of hot water poured into the funnel $v$ or to heat the water if it has been poured in warm or cold. In this case its cover is pierced with a hole, $m$, to prevent accident.

$r^2$ is a tap placed at any convenient point in the pipe $d$ to drain the water from said pipe.

The other parts of the apparatus are indicated by the same letters as the corresponding parts in Fig. 1.

Having now described the nature of my said invention, and the manner in which the same is or may be carried into effect, I would have it understood that what I claim as my invention is—

The combination of the outer and inner vessels, $b\ c$, filters $f\ f'$, pipe $d$, and water-receptacle $v$, for the purpose of obtaining a head of water and filtering it by hydrostatic pressure through the coffee or tea in the vessel $c$ and flowing it over into the receptacle prepared for it, substantially as described.

ERNEST BAZIN.

Witnesses:
A. BLÉTRIT,
L. GILLEY.